J. BAYER, JR.
FASTENING DEVICE.
APPLICATION FILED MAY 25, 1912.
Reissued July 14, 1914. 13,769.
*Fig. 1,*
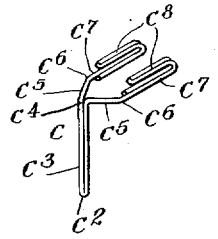
*Fig. 2,*
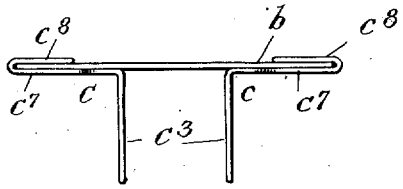
*Fig. 3,*
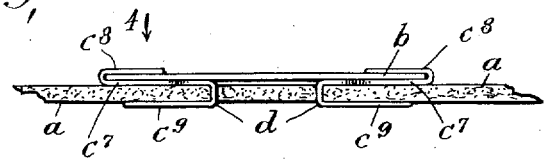
*Fig. 4,*
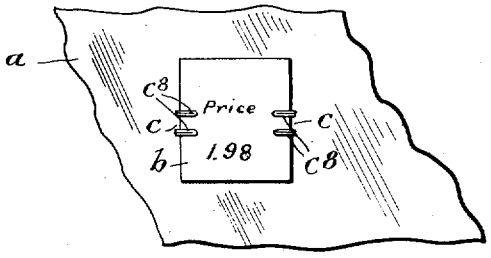
WITNESSES
John O. Templer
Geo. M. Harris.
INVENTOR
Joseph Bayer Jr.
BY
Kenyon & Kenyon
ATTORNEY

UNITED STATES PATENT OFFICE.

JOSEPH BAYER, JR., OF NEW YORK, N. Y., ASSIGNOR, BY MESNE ASSIGNMENTS, TO NOESTING PIN-TICKET COMPANY, INC., A CORPORATION OF NEW YORK.

FASTENING DEVICE.

13,769. Specification of Reissued Letters Patent. Reissued July 14, 1914.

Original No. 1,023,237, dated April 16, 1912, Serial No. 618,887. Application for reissue filed May 25, 1912. Serial No. 699,825.

*To all whom it may concern:*

Be it known that I, JOSEPH BAYER, Jr., a citizen of the United States, and residing at New York, in the county of New York and State of New York, have invented certain new and useful Improvements in Fastening Devices, of which the following is a specification, such as will enable those skilled in the art to which it appertains to make and use the same.

This invention relates to fastening devices, and particularly to devices of this class designed for use in securing price tags or other marks to cloth or fabric, and the object thereof is to provide an improved fastening device of this class which is simple in construction, effective in use and comparatively inexpensive and which is devoid of sharp points and which can be used without scratching or cutting the hands and which will not engage with any other piece of cloth or fabric except that to which the tag is secured.

The invention is fully disclosed in the following specification, of which the accompanying drawing forms a part, in which the separate parts of my invention are designated by suitable reference characters in each of the views, and in which:—

Figure 1 is a perspective view of one of my improved fastening devices; Fig. 2, a side edge view of a price tag showing two of my improved fastening devices connected therewith; Fig. 3, a view similar to Fig. 2 but showing the method of connecting the tag and fastening device with a piece of cloth or other fabric; and Fig. 4, a view looking in the direction of the arrow 4 of Fig. 3 but on a reduced scale.

In the drawing forming part of this specification I have shown at $a$ a piece of cloth or other fabric and at $b$ a price tag connected therewith by means of my improved fastening device $c$, two of which are employed.

The fastening device $c$ is made from a piece of stiff wire bent centrally as shown at $c^2$ in Fig. 1, to form two similar side portions which are compressed together to form a double shank $c^3$ of predetermined length and which extends to the point $c^4$, from which point the side portions of the wire diverge, as shown at $c^5$, to a predetermined point as at $c^6$, from which point the end portions are doubled and pressed together to form parallel shank members $c^7$ which are bent to form hooks $c^8$, and the shank portion $c^3$ projects at right angles to the parts $c^5$ and $c^7$ which are all in the same plane and the hook members $c^8$ are also parallel and in a plane parallel with that of the parts $c^5$, $c^6$ and $c^7$, as clearly shown in Figs. 1 and 2.

In connecting the tag $b$ with a cloth or other fabric, two of the hook or fastening devices are employed and the tag is placed in the hook members $c^8$, or said hook members are slipped on over the opposite side edges of the tag, as clearly shown in Fig. 2, after which the shank members $c^3$ are passed through the cloth or fabric $a$, as shown at $d$ in Fig. 3, and then bent in opposite directions to form hooks $c^9$. The shank or pin $c^3$ being provided with a rounded end $c^2$ tends to separate the threads or fibers of the fabric to permit the shank to pass through, and is not liable to break the threads or fibers.

It will be understood that a tag or similar device of any desired size or shape may be thus connected with any kind or class of fabric or similar material, and when made in the manner described my improved fastening device or devices are devoid of points or sharp portions and will not cut or scratch the hands, and said fastening device or devices will not engage or stick into any fabric or cloth other than that to which the tag is applied.

Having fully described my invention, what I claim as new, and desire to secure by Letters Patent, is;—

1. A fastening device of the class described, comprising a wire bent centrally to form a doubled penetating shank of predetermined length, the parts of which lie close together and from which said parts then diverge to a predetermined point from which point side portions extend parallel, said parallel side portions being folded and the ends thereof extended toward the shank and bent back upon themselves to form two parallel hooks opening toward the shank, the ends of the wire being finally arranged close to the parallel side portions and inside the same.

2. A tag holder comprising a piece of wire with a pin portion with a rounded end adapted to be inserted in the material to be tagged, and a hook portion formed of a free end of the wire extending substantially perpendicular to the pin portion said hook portion adapted to engage the edge of the tag to hold the tag substantially at right angles to the pin portion the free end of the wire forming the hook adapted to engage with the under surface of the tag.

3. A tag holder comprising a piece of wire with a pin portion with a rounded end adapted to be inserted in the material to be tagged, and an integral hook portion formed of the free ends of the wire comprising two spaced apart hooks lying substantially at right angles to the pin portion for engagement with the edge of the tag to hold the tag substantially at right angles to the pin portion the free ends of said wire adapted to engage with the under surface of the tag.

4. A tag holder comprising a piece of wire bent upon itself to form a pin composed of two members with a rounded end pin point at the bend, the free ends of said members being diverged and bent at substantially right angles to the pin, each member being formed into a hook, both hooks lying in a position to simultaneously engage the same edge of the tag to hold the same substantially at right angles to the pin the free ends of said wire adapted to engage with the under surface of the tag.

5. A tag-holder formed of a wire bent to form a pin, composed of two members, with a rounded-end-pin point at the bend, said members being diverged at substantially right angles to the pin, each member being formed into a hook arranged to engage with both faces of a tag, the free ends of the wire engaging with the underside of the ticket.

In testimony that I claim the foregoing as my invention I have signed my name in presence of the subscribing witnesses this 24th day of May, 1912.

JOSEPH BAYER, Jr.

Witnesses:

Edwin Segar,

Geo. W. Mills, Jr.